Nov. 20, 1928.

R. BACCI ET AL 1,691,953

DECOMPRESSOR VALVE

Filed Dec. 24, 1925

Inventors
Romeo Bacci
and Guido Vacca
by
Attorney.

Patented Nov. 20, 1928.

1,691,953

UNITED STATES PATENT OFFICE.

ROMEO BACCI AND GUIDO VACCA, OF TRIESTE, ITALY.

DECOMPRESSOR VALVE.

Application filed December 24, 1925, Serial No. 77,637, and in Italy January 2, 1925.

Decompression valves for internal combustion engines are known, which permit the direct escape of the gases of the engine cylinders, as well as the direct introduction of small quantities of combustible liquid into the cylinders to facilitate engine starting. These valves also enable the inspection of any cylinder to ascertain if it is working properly simply by observing whether the escaping gases are ignited and have a bluish flame.

The known types of these valves have certain disadvantages, the three principal ones being: (1) that the valve body, which is pressed mechanically against its seat in the interior of the cylinder, does not always form a gas-tight joint therewith under the action of the internal pressure; (2) that the aforesaid valve seat, which is constantly exposed, without protection of any character, to the flaming gases, wears very rapidly; and finally (3) that the valve body or valve proper materially chokes the passage through the device, so that the combustion flame is swallowed up and becomes exhausted in the tortuous path which it must travel before reaching the outside, and the escaping gases lose their characteristic color.

These objections can be overcome by providing a structure in which the valve body or valve proper is disposed toward the interior of the cylinder with relation to its seat; such arrangement enabling a gas-tight joint to be obtained, and also enabling the outlet passage to be kept perfectly unobstructed and virtually rectilinear.

Figure 1:
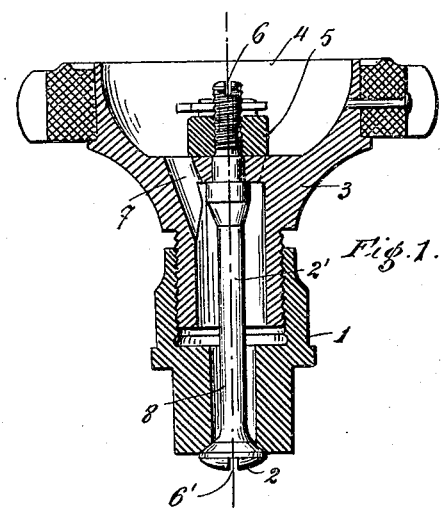
Figure 2:
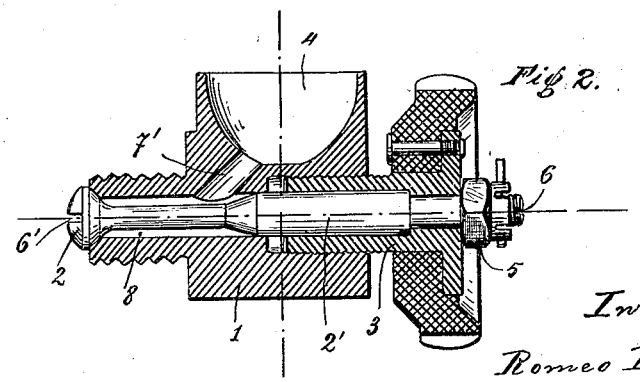

In the accompanying drawing, Figure 1 shows, in vertical section, the preferred embodiment of our invention, and Fig. 2 shows a similar view of a slight modification thereof.

Referring more particularly to the drawing, 1 indicates a substantially cylindrical casing which is adapted to be securely mounted in the cylinder of the engine in any desired manner and which, in the form shown in Fig. 1, is disposed in vertical position in the upper portion of the cylinder, whereas in Fig. 2 it is arranged horizontally. This casing is formed with a bore or passage, the inner portion 8 of which is of much smaller diameter than the outer portion; the latter portion having its wall threaded for engagement by the reduced inner portion or stem of a head or member 3.

The free inner end of casing 1 is formed with a seat for a valve 2 which is disposed toward the interior of the cylinder with relation to such seat, and the stem 2' of which extends axially through the passage 8 and, also, through the bore of the stem of member 3 and projects through the center of the outer face of said member. The projecting outer portion of the valve stem is threaded, as shown, and to receive a nut 5 adapted to be screwed tightly against the said outer face of said member so as to fasten the valve to the aforesaid member in adjusted position. Due to this coupling of the valve to the member 3, it will be apparent that by turning the latter in one direction or the other the valve proper 2 will be moved axially into or out of its seat, so as to provide either a tight seal at the end of the passage 8 or a space or opening at such point which will enable communication between the passage and the interior; such communication being extended to atmosphere through a short, inclined branch passage or passages 7 or 7' subsequently described. The pressure which the valve 2 is caused to exert against its seat when in closed position may be varied slightly, independently of the movement of the operating member 3, by turning nut 5 in the proper direction. Furthermore, the internal pressure within the engine cylinder tends to force valve 2 against its seat; and it sets up a gripping interaction between the threads on the parts 3 and 1, so that any tendency of these two parts to move relatively to each other owing to the vibrations of the engine when running is thereby avoided.

In order to enable the device to be used for priming purposes, a cup 4 to receive the priming agent may be provided and may be formed either by dishing the outer or top face of the operating member 3 (Fig. 1) or by dishing an upwardly-projecting enlargement on the top of casing 1 (Fig. 2). The previously-mentioned branch passages 7 and 7' lead from these cups to deliver the priming liquid to the cylinders when the corresponding valves are open; the passage or passages 7 opening into the bore of the stem of member 3, while the passage or passages 7' open directly into passage 8.

The rotary movement imparted to the valve body 2 when the head or member 3 is operated has the effect of removing the deposits of carbon which inevitably form around the valve seat; and in case regrinding becomes necessary, the valve body and the free end of its stem may be slotted, as indicated at 6 and

We claim as our invention:—

1. A decompressor valve for internal combustion engine cylinders, comprising a cylindrical casing adapted to be secured to an engine cylinder and having an axial passage and a valve seat at the inner end thereof; an operating head having a threaded connection with said casing to enable its rotary and endwise adjustment with respect thereto; a valve stem extending through said passage and projecting beyond the outer face of said head and having its projecting portion threaded; a clamping nut fitted on said projecting portion and adapted to be tightened against said outer face to secure the stem rigidly to said head for movement with the same, said stem being adapted to move axially in either direction independently of and relatively to said head when the nut is turned on the stem; a valve body at the inner end of said stem for coaction with the valve seat to control communication between the interior of the cylinder and said passage; and a branch passage leading to the outside from the first-named passage to permit the gases within the cylinder to escape when the valve body is open.

2. A decompressor valve, according to claim 1, in which the outer face of the operating head is dished to form a priming cup, through the bottom of which the threaded portion of the valve stem projects; and in which the branch passage leading from the axial passage opens through said cup bottom.

3. A decompressor valve, according to claim 1, in which the free end of the projecting portion of the valve stem is provided with a slot for engagement by a tool for turning said stem when the clamping nut is loosened, thereby to cause rotation of the valve body unaccompanied by axial movement, so as to clean said body from substances deposited thereon.

In testimony whereof we affix our signatures.

ROMEO BACCI.
GUIDO VACCA.